US010746705B1

(12) United States Patent
Deguchi et al.

(10) Patent No.: US 10,746,705 B1
(45) Date of Patent: Aug. 18, 2020

(54) METHOD FOR EVALUATING NOISE OF GLASS RUN

(71) Applicant: NISHIKAWA RUBBER CO., LTD., Hiroshima-shi, Hiroshima-ken (JP)

(72) Inventors: Koso Deguchi, Hiroshima (JP); Hiromu Oda, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 0 days.

(21) Appl. No.: 16/724,073

(22) Filed: Dec. 20, 2019

(30) Foreign Application Priority Data

Feb. 28, 2019 (JP) .................................. 2019-036393

(51) Int. Cl.
```
G01H 1/04      (2006.01)
G01N 29/14     (2006.01)
G01M 17/007    (2006.01)
```

(52) U.S. Cl.
CPC ............... *G01N 29/14* (2013.01); *G01H 1/04* (2013.01); *G01M 17/007* (2013.01)

(58) Field of Classification Search
CPC ............ G01H 17/00; G01H 3/00; B60J 10/50
USPC ........................................................ 73/584
See application file for complete search history.

(56) References Cited

U.S. PATENT DOCUMENTS

| 6,747,399 B1 * | 6/2004 | Ogino .................. H01L 41/087 310/330 |
| 2014/0196252 A1 * | 7/2014 | Sakai ...................... E05F 1/002 16/71 |
| 2017/0254135 A1 * | 9/2017 | Takehara ................ E05F 15/44 |
| 2018/0120264 A1 | 5/2018 | Sato et al. |

FOREIGN PATENT DOCUMENTS

| CN | 202126386 | * | 1/2012 |
| CN | 207485204 | * | 6/2018 |
| JP | 6225368 B1 | | 10/2017 |
| JP | 6647445 | * | 2/2020 |
| KR | 20020055665 | * | 7/2002 |

* cited by examiner

*Primary Examiner* — Jacques M Saint Surin
(74) *Attorney, Agent, or Firm* — Holtz, Holtz & Volek PC (57) ABSTRACT

A method for evaluating noise of a glass run of an automobile door includes: detecting oscillation of the door glass by a sensor for the door glass and then storing the oscillation as an oscillatory wave form of the door glass and detecting oscillation of the frame by a sensor for the frame and then storing the oscillation as an oscillatory wave form of the frame, with the glass run coupling to the automobile door; synthesizing the oscillatory wave form of the door glass and the oscillatory wave form of the frame, picking out relative oscillation of the door glass in relation to the frame and storing the relative oscillation as a synthesized oscillatory wave form; making oscillation corresponding to the synthesized oscillatory wave form by an oscillator and oscillating the door glass with the automobile stopped; and detecting sound of the oscillation by a microphone.

12 Claims, 8 Drawing Sheets

METHOD FOR EVALUATING NOISE OF GLASS RUN

CROSS REFERENCE TO RELATED APPLICATION

This application claims the benefit under 35 USC § 119 of JP Patent Application JP 2019-036393 filed Feb. 28, 2019, the entire disclosure of which is incorporated herein by reference.

BACKGROUND INFORMATION

The present invention relates to a method for evaluating noise of a glass run of an automobile door, for guiding a door glass in a frame.

The glass run of the automobile door couples to the frame, for guiding the door glass in the frame. The frame includes a door sash and a door frame.

The glass run makes noise when the automobile moves on bumpy roads or when the door is closed with the automobile stopped.

The noise is called "glass-run noise".

Since members other than the glass run as well as the glass run make the noise, the noise made by the glass run is difficult to separate.

Examples of the noise of the members other than the glass run include squeak of the parts for the automobile door (interior trim, resin cover, and the like), road noise of tires, engine noise, and wind noise.

In this connection, Japanese Patent No. 6225368 discloses a method for detecting noise of a steering system of the automobile and an apparatus for evaluating the noise. But Japanese Patent No. 6225368 is not effective in evaluating the noise of the glass run.

Therefore, an object of the present invention is to provide the method for evaluating the noise of the glass run, which is capable of reproducing oscillation on a real automobile.

SUMMARY

In order to achieve the above-mentioned object, according to one aspect of the invention, a method for evaluating noise of a glass run (10) of an automobile door (1) is provided. The glass run (10) guides a door glass (2) in a frame (100). The glass run (10) forms a channel (19).

The method includes:

detecting oscillation of the door glass (2) by a sensor (20) for the door glass and then storing the oscillation as an oscillatory wave form (300) of the door glass and detecting oscillation of the frame (100) by a sensor (30) for the frame and then storing the oscillation as an oscillatory wave form (400) of the frame, with the glass run (10) coupling to the automobile door;

synthesizing the oscillatory wave form (300) of the door glass and the oscillatory wave form (400) of the frame, picking out relative oscillation of the door glass (2) in relation to the frame (100) and storing the relative oscillation as a synthesized oscillatory wave form (500);

making oscillation by an oscillator (40) and oscillating the door glass (2) with the automobile stopped, the oscillation corresponding to the synthesized oscillatory wave form (500), the oscillator (40) being on an exterior of the automobile; and detecting sound of the oscillation by a microphone (50), the oscillation being made by the oscillator (40), the oscillation corresponding to the synthesized oscillatory wave form (500), the microphone (50) being on an interior of the automobile.

In addition, according to one aspect of the invention, a method for evaluating noise of a glass run (10) of an automobile door (1) is provided. The glass run (10) guides a door glass (2) in a frame (100). The glass run (10) forms a channel (19).

The method includes:

detecting oscillation of the door glass (2) by a sensor (20) for the door glass and then storing the oscillation as an oscillatory wave form (300) of the door glass and detecting oscillation of the frame (100) by a sensor (30) for the frame and then storing the oscillation as an oscillatory wave form (400) of the frame, with the glass run (10) coupling to the automobile door;

synthesizing the oscillatory wave form (300) of the door glass and the oscillatory wave form (400) of the frame, picking out relative oscillation of the door glass (2) in relation to the frame (100) and storing the relative oscillation as a synthesized oscillatory wave form (500);

coupling the glass run (10) to a mock frame (101) on an experimental bench (200), guiding a mock door glass (102) in the mock frame (101), making oscillation by an oscillator (40) and oscillating the mock door glass (102), the mock frame (101) corresponding to the frame (100), the mock door glass (102) corresponding to the door glass (2), the oscillation corresponding to the synthesized oscillatory wave form (500), the oscillator (40) being on a surface of the mock door glass (102); and detecting sound of the oscillation by a microphone (50), the oscillation being made by the oscillator (40), the oscillation corresponding to the synthesized oscillatory wave form (500), the microphone (50) being on a rear surface of the mock door glass (102).

In addition, according to an aspect of the present invention, the sensor (20) for the door glass and the sensor (30) for the frame detect oscillation. The oscillation is made while the automobile is moving.

In addition, according to an aspect of the present invention, the sensor (20) for the door glass and the sensor (30) for the frame detect oscillation. The oscillation is made when the automobile door (1) is moved to a closed position from an opened position with the automobile stopped.

In addition, according to an aspect of the present invention, the door glass (2) is at a distance from the closed position and at a distance from a fully-opened position when the sensor (20) for the door glass and the sensor (30) for the frame detect the oscillation.

In addition, according to an aspect of the present invention, the method further includes visualizing the sound detected by the microphone (50).

In addition, according to an aspect of the present invention, the method further includes amending the wave forms after oscillating the door glass (2). Amending the wave forms includes: making oscillation which corresponds to the synthesized oscillatory wave form (500) by the oscillator (40), detecting the oscillation of the door glass (2) by the sensor (20) for door glass and detecting the oscillation of the frame (100) by the sensor (30) for the frame, picking out a synthesized oscillatory wave form, as a real synthesized oscillatory wave form (800), to oscillate the door glass (2) artificially, comparing the synthesized oscillatory wave form (500) with the real synthesized oscillatory wave form (800), and amending the real synthesized oscillatory wave form (800) by altering an output from the oscillator (40) such that difference between the synthesized oscillatory wave form (500*o*) and the real synthesized oscillatory wave form (800) is not more than a fixed value (700); and substituting the real synthesized oscillatory wave form (800), which is amended in amending the wave forms, for the synthesized oscillatory wave form (500), which is in detecting sound.

In addition, according to an aspect of the present invention, the method further includes amending the wave forms after oscillating the mock door glass (102). Amending the wave forms includes: making oscillation which corresponds to the synthesized oscillatory wave form (500) by the oscillator (40), detecting the oscillation of the mock door glass (102) by the sensor (20) for door glass and detecting the oscillation of the mock frame (101) by the sensor (30) for the frame, picking out a synthesized oscillatory wave form, as a real synthesized oscillatory wave form (800), to oscillate the mock door glass (102) artificially, comparing the synthesized oscillatory wave form (500) with the real synthesized oscillatory wave form (800), and amending the real synthesized oscillatory wave form (800) by altering an output from the oscillator (40) such that difference between the synthesized oscillatory wave form (500*o*) and the real synthesized oscillatory wave form (800) is not more than a fixed value (700); and substituting the real synthesized oscillatory wave form (800), which is amended in amending the wave forms, for the synthesized oscillatory wave form (500), which is in detecting sound.

Symbols in parentheses show constituents or items corresponding to the drawings.

According to the present invention, the method for evaluating the noise of the glass run of the automobile door includes: detecting the oscillatory wave form of the door glass by the sensor for the door glass, and detecting the oscillatory wave form of the frame by the sensor for the frame, with the glass run coupling to the automobile door; synthesizing the oscillatory wave form of the door glass and the oscillatory wave form of the frame, and picking out the relative oscillation of the door glass as the synthesized oscillatory wave form in relation to the frame. With this configuration, the sound made by the glass run alone is detected.

In addition, the method includes: making the oscillation, which corresponds to the synthesized oscillatory wave form, by the oscillator and oscillating the door glass; and detecting the sound by the microphone on the interior of the automobile. With this configuration, the oscillation of the glass run and the sound accompanying the oscillation made on the real automobile is reproduced.

Reproduction of the oscillation and the sound enables repeated experiments to modify the glass run in shape and material in consideration of the oscillation of the glass run.

In addition, the method includes: coupling the glass run to the mock frame on the experimental bench, guiding the mock door glass in the mock frame, making the oscillation which corresponds to the synthesized oscillatory wave form by the oscillator on the front surface of the mock door glass, oscillating the mock door glass; and detecting the sound of the oscillation which is made by the oscillator and which corresponds to the synthesized oscillatory wave form by the microphone on the rear surface of the mock door glass. With this configuration, the oscillation of the glass run and the sound accompanying the oscillation, which are made on the real automobile, are reproduced on the experimental bench.

Accordingly, a small space is sufficient to design the glass run.

In addition, the sensor for the door glass and the sensor for the frame detect the oscillation which is made while the automobile is moving. This configuration is effective in designing the glass run capable of controlling oscillation when the automobile moves on bumpy roads or the like.

In addition, the sensor for the door glass and the sensor for the frame detect the oscillation which is made when the automobile door is moved to the closed position from the opened position with the automobile stopped. This configuration is effective in designing the glass run capable of controlling oscillation when the door is closed.

In addition, the door glass is at the distance from the closed position and at the distance from the fully-opened position, that is the door glass is opened but not to a full width, when the sensor for the door glass and the sensor for the frame detect the oscillation. With this configuration, the oscillation in case the oscillation of the glass run is large and the sound accompanying the large oscillation is reproduced.

In addition, the method further includes visualizing the sound of the oscillation detected by the microphone. With this configuration, the sound accompanying the oscillation of the glass run is easily realized.

In addition, the method further includes amending the wave forms after oscillating the door glass on the real automobile. In case the difference between the real synthesized oscillatory wave form and the synthesized oscillatory wave form exceeds the fixed value, the real synthesized oscillatory wave form is controlled to approach the synthesized oscillatory wave form by altering the output from the oscillator. The synthesized oscillatory wave form corresponds to the oscillation made by the oscillator. The real synthesized oscillatory wave form corresponds to the artificial oscillation made on the door glass. With this configuration, the oscillation of the glass run and the sound accompanying the oscillation, which are made on the real automobile, are reproduced on an experimental automobile more precisely.

Since the oscillator makes the oscillation which corresponds to the synthesized oscillatory wave form and the artificial oscillation made on the door glass which corresponds to the real synthesized oscillatory wave form, the real synthesized oscillatory wave form should be the same as the synthesized oscillatory wave form. But when the oscillator makes the oscillation, a prop to which the oscillator couples, for example, as well as the oscillator oscillates and therefore, the oscillation is attenuated. Also, an environment surrounding the real automobile varies the oscillation. In this connection, amending the wave forms performs a feedback control to amend the difference such that the real synthesized oscillatory wave form is the same as the synthesized oscillatory wave form.

In addition, the method further includes amending the wave forms after oscillating the mock door glass on the experimental bench. In case the difference between the real synthesized oscillatory wave form and the synthesized oscillatory wave form exceeds the fixed value, the real synthesized oscillatory wave form is controlled to approach the synthesized oscillatory wave form by altering the output from the oscillator. The synthesized oscillatory wave form corresponds to the oscillation made by the oscillator. The real synthesized oscillatory wave form corresponds to the artificial oscillation made on the mock door glass. With this configuration, the oscillation of the glass run and the sound accompanying the oscillation, which are made on the real automobile, are reproduced on the experimental bench more precisely.

Since the oscillator makes the oscillation which corresponds to the synthesized oscillatory wave form and the artificial oscillation made on the mock door glass corresponds to the real synthesized oscillatory wave form, the real synthesized oscillatory wave form should be the same as synthesized oscillatory wave form. But when the oscillator makes the oscillation, the prop to which the oscillator couples, for example, as well as the oscillator oscillates and therefore, the oscillation is attenuated. Also, the environment surrounding the experimental bench varies the oscillation. In this connection, amending the wave forms performs the feedback control to amend the difference such that the real synthesized oscillatory wave form is the same as the synthesized oscillatory wave form.

DETAILED DESCRIPTION

Referring to the Drawings, a method according to an embodiment of the present invention for evaluating noise of a glass run will be described.

Figure 1:
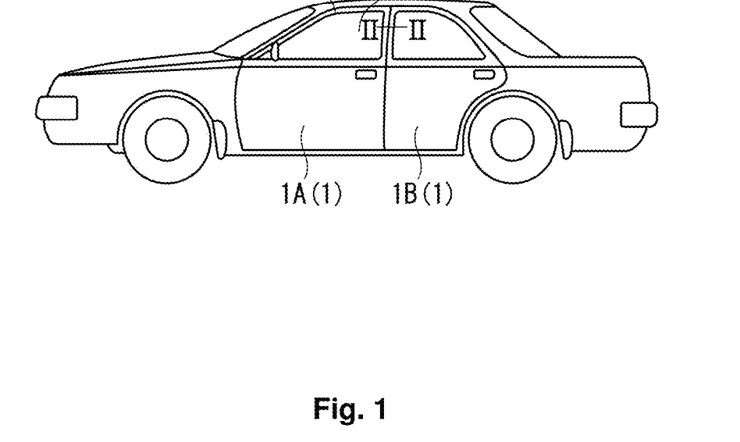
FIG. 1 is a side view of an automobile.
Figure 2:
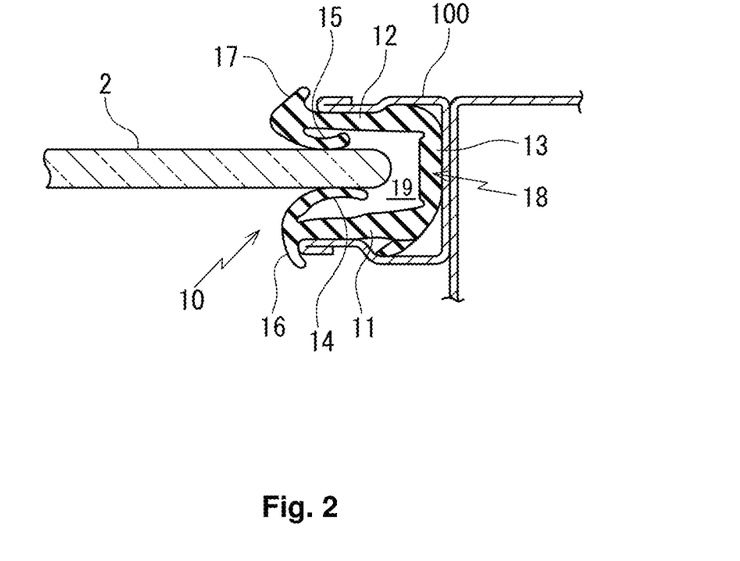
FIG. 2 is an enlarged cross-sectional view of a glass run taken along line II-II of FIG. 1 with the glass run coupling to a front door of FIG. 1.

As illustrated in FIG. 1 and FIG. 2, a glass run 10 of an automobile door 1 (front door 1A(1), rear door 1B(1)) couples to a frame 100, for guiding a door glass 2 in the frame 100. The frame 100 includes a door sash and a door frame.

The glass run 10 in general includes a body 18, an inner lip 14, an outer lip 15, an inner-cabin side lip 16, and an outer-cabin side lip 17. The body 18 has a substantially U-shaped cross-section including: an inner-cabin side wall 11; an outer-cabin side wall 12; and a connecting wall 13, which connects the side walls 11, 12 and forms a channel 19. The inner lip 14 extends toward an exterior of the automobile from an end of the inner-cabin side wall 11 and is slidably brought into contact with an inner-cabin side surface of the door glass 2. The outer lip 15 extends toward an interior of the automobile from an end of the outer-cabin side wall 12 and is slidably brought into contact with an outer-cabin side surface of the door glass 2. The inner-cabin side lip 16 extends toward the interior of the automobile from the end of the inner-cabin side wall 11 and holds the frame 100. The outer-cabin side lip 17 extends toward the exterior of the automobile from the end of the outer-cabin side wall 12 and holds the frame 100.

Figure 3:
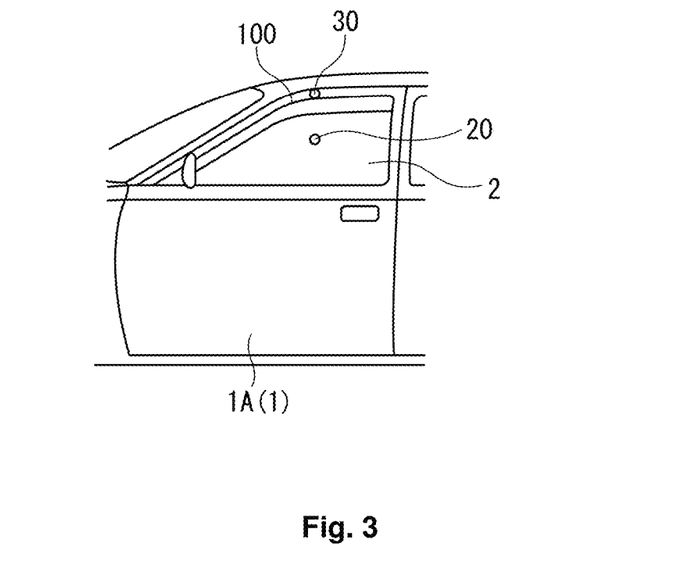
FIG. 3 is a side view of a position of a sensor 20 for a door glass and a position of a sensor 30 for a frame in relation to a position of the front door of FIG. 1.
Figure 4:
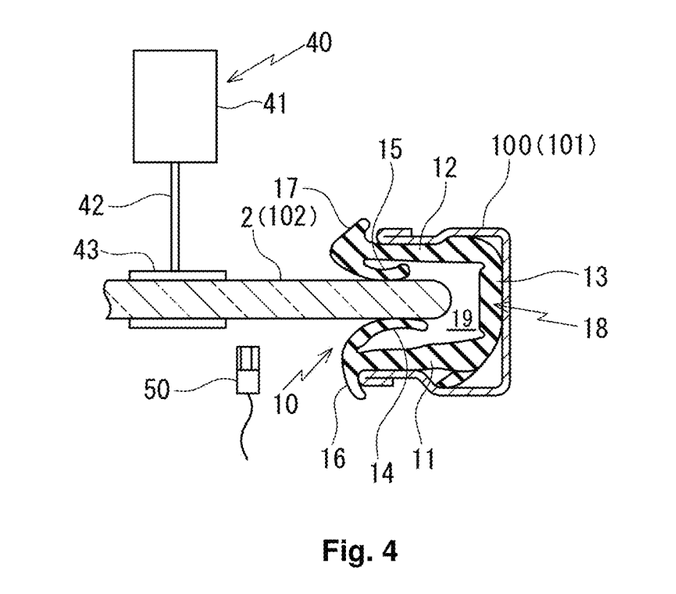
FIG. 4 is a partial cross-sectional view of the glass run practicing a method according to an embodiment of the invention of evaluating noise of the glass run.
Figure 5:
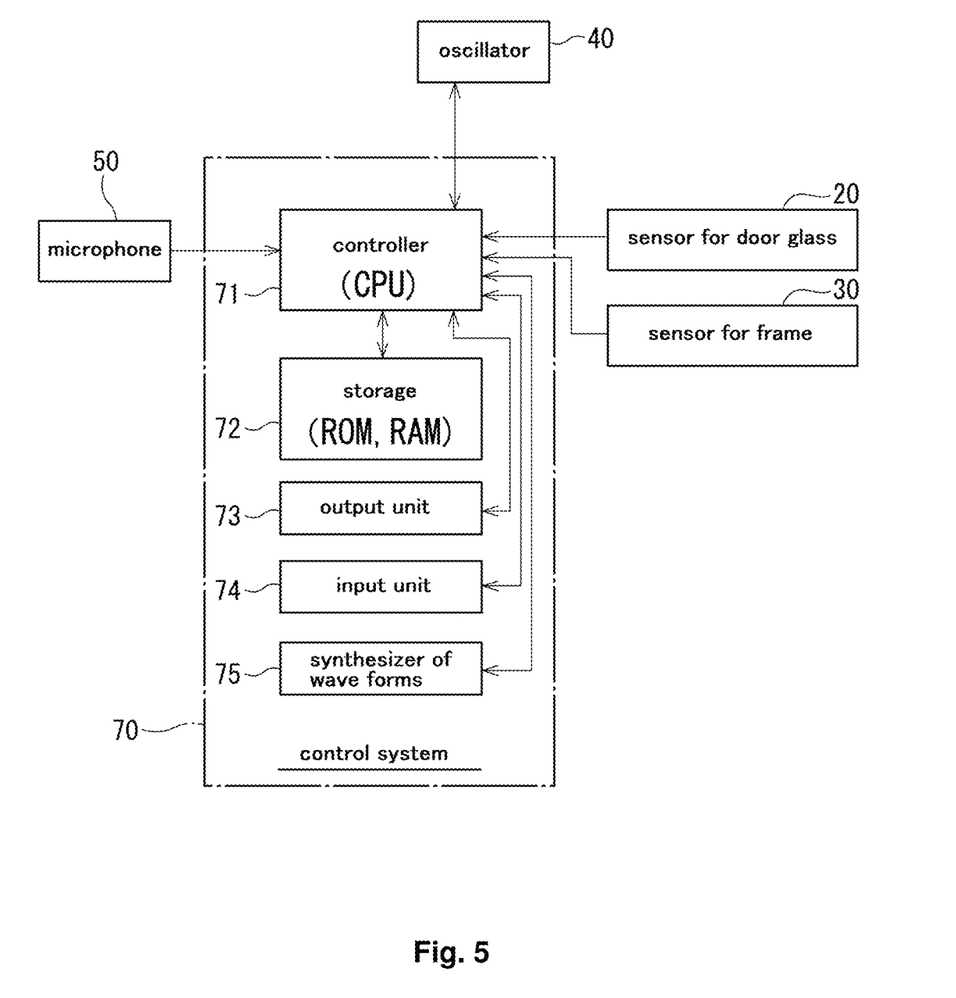
FIG. 5 is a block diagram illustrating electrical components for practicing the method according to the embodiment of the invention of evaluating the noise of the glass run.

An evaluation system to practice the method according to the embodiment of the present invention for evaluating the noise of the glass run includes a sensor 20 for the door glass and a sensor 30 for the frame, which are illustrated in FIG. 3, an oscillator 40 and a microphone 50, which are illustrated in FIG. 4, and a control system 70, which is illustrated in FIG. 5. The sensor 20 is fixed on the door glass 2 and detects oscillation. The sensor 30 is fixed on the frame 100 and detects oscillation. The oscillator 40 makes the oscillation. The microphone 50 detects sound. The control system 70 controls a system as a whole.

The sensor 20 is fixed on an outer-cabin side (or inner-cabin side) of the door glass 2 and detects the oscillation of the door glass 2.

The sensor 30 is fixed on an outer-cabin side of the frame 100 and detects the oscillation of the frame 100.

While in this embodiment, the sensor 20 and the sensor 30 are contact sensors and are fixed on the door glass 2 and the frame 100, respectively, this should not be construed in a limiting sense. Another possible embodiment is that the sensor 20 and the sensor 30 are contactless sensors capable of sensing displacement of the oscillation and a wave form.

The oscillator 40 is fixed on the exterior of the automobile and includes a body 41, an arm 42, and a holding part 43. The arm 42 extends from the body 41. The holding part 43 is on a top end of the arm 42 and holds an upper end of the door glass 2. The oscillator 40 makes oscillations in accordance with a required oscillatory wave form.

While in this embodiment, the oscillator 40 includes the body 41, the arm 42, and the holding part 43, this should not be construed in a limiting sense. Another possible embodiment is that the oscillator 40 has another configuration capable of oscillating the door glass 2 exclusively.

The microphone is on an interior of the automobile and is fixed on a position, for example, as high as drivers' ears.

The control system 70 includes a controller 71, a storage 72, an output unit 73, an input unit 74, and a synthesizer 75 of wave forms. The output unit 73 includes a display for power output. The input unit 74 includes keyboards and a mouse for power input.

The controller 71 includes CPU and controls the system as the whole in accordance with a controlling program.

The storage 72 includes a storage medium such as ROM and RAM. ROM stores the controlling program and the like. RAM temporarily stores datum.

The synthesizer 75 synthesizes two oscillatory wave forms transmitted by the controller 71. Method of synthesizing the two oscillatory wave forms include: adding two oscillatory wave forms; and finding difference between the two oscillatory wave forms which is the difference between a first oscillatory wave form and a second oscillatory wave form.

Evaluation of the noise of the glass run by the evaluation system having this configuration will be discussed.

The glass run 10 and surroundings on a real automobile make noise when the door 1 is moved to a closed position from an opened position with the automobile stopped and when the automobile moves especially on bumpy roads. But the noise which is made when the door 1 is closed is not the same as the noise which is made when the automobile moves on bumpy roads. First, the method of evaluating the noise when the door 1 is closed will be discussed.

when the door 1 is closed (the automobile is stopped)

The sensor 20 for the door glass and the sensor 30 for the frame are fixed on the door glass 2 and the frame 100, respectively, with the automobile stopped (the glass run 10 couples to the frame 100 of the real automobile). While in the present embodiment, the sensor 20 is fixed at an upper side part of the door glass 2 in an upper and a lower direction in relation to the automobile body and at a center in a front and a rear direction, and the sensor 30 is fixed at a center of the frame 100 on an extension line in the upper and the lower direction of the sensor 20 as illustrated in FIG. 3, this configuration should not be construed in a limiting sense. Any sensors 20 and sensors 30 are usable as long as the sensors 20 and the sensors 30 are fixed on the door glass 2 and the frame 100, respectively. Examples of the usable sensor 20 and the usable sensor 30 include the contactless sensors as discussed above.

The door glass 2 is at a slight distance from the closed position. In the present embodiment, the door glass 2 is between a closed position and a half-open (½) position.

The door 1 is moved to the closed position from the opened position at a speed of 1.2 m/s.

When the door 1 is closed, a shock is generated and makes oscillation. The sensor 20 detects the oscillation of the door glass 2 and the sensor 30 detects the oscillation of the frame 100 simultaneously. The sensor 20 and the sensor 30 transmit detected information to the controller 71. The controller 71 stores the oscillation of the door glass 2 as the oscillatory wave form 300 of the door glass and the oscillation of the frame 100 as the oscillatory wave form 400 of the frame at the storage 72.

Figure 6:
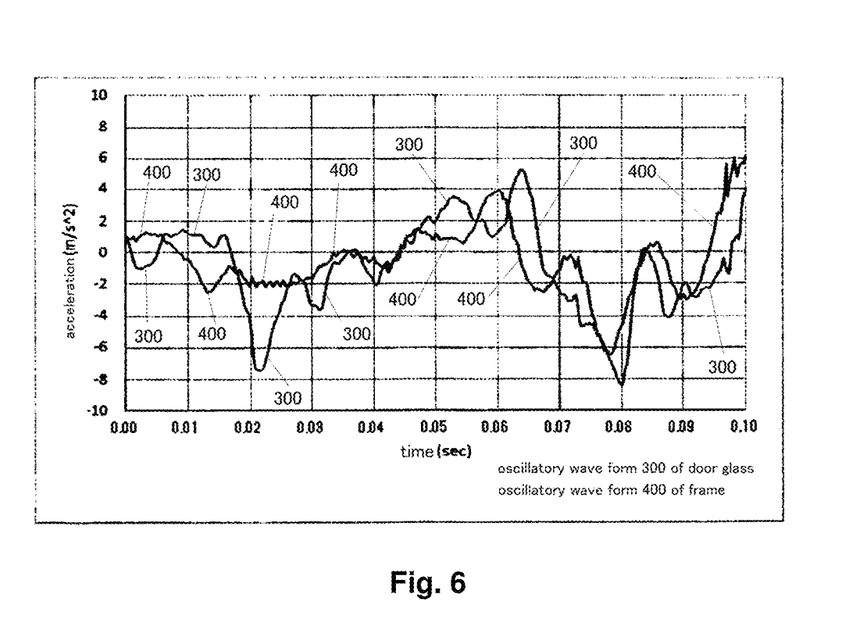
FIG. 6 is a graph illustrating a relationship between an oscillatory wave form (300) of the door glass and an oscillatory wave form (400) of the frame in the method according to the embodiment of the invention of evaluating noise of the glass run, the oscillatory wave form (300) being detected by the sensor 20, the oscillatory wave form (400) being detected by the sensor 30.

FIG. 6 illustrates an example of the oscillatory wave form 300 and the oscillatory wave form 400.

The controller 71 transmits the oscillatory wave form 300 and the oscillatory wave form 400 to the synthesizer 75 of the wave forms. The synthesizer 75 synthesizes the oscillatory wave form 300 and the oscillatory wave form 400, and picks out relative oscillation of the door glass 2 in relation to the frame 100 as a synthesized oscillatory wave form 500. More specifically, the synthesized oscillatory wave form 500 is found by deducting value of the oscillatory wave form 400 from value of the oscillatory wave form 300. The synthesizer 75 transmits the synthesized oscillatory wave form 500 to the controller 71. The controller 71 stores the synthesized oscillatory wave form 500 at the storage 72.

Figure 7:
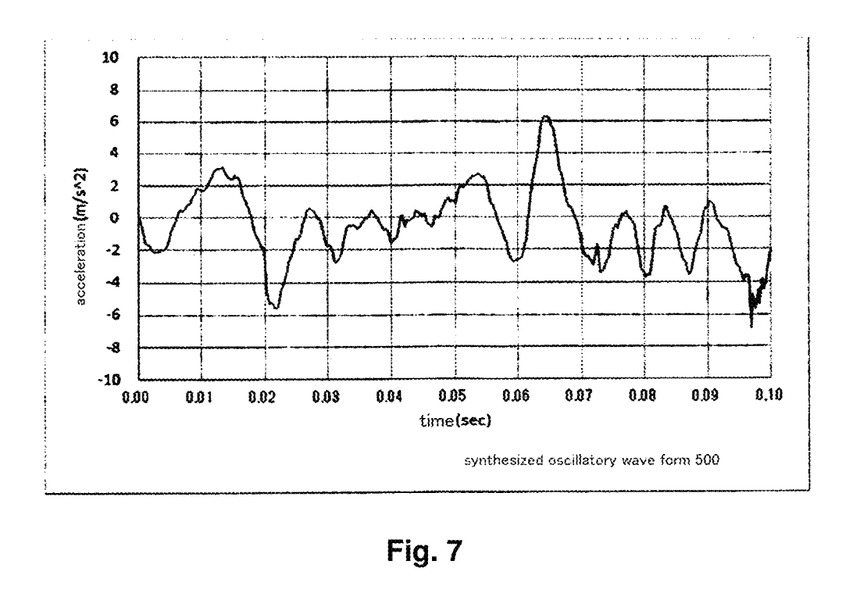
FIG. 7 is a graph illustrating a synthesized oscillatory wave form (500), which is a relative oscillation of the door glass 2 in relation to the frame 100, the synthesized oscillatory wave form (500) being picked out from synthesis of the oscillatory wave form (300) and the oscillatory wave form (400) of FIG. 6.

FIG. 7 illustrates the synthesized oscillatory wave form 500, found by synthesizing the oscillatory wave form 300 and the oscillatory wave form 400 (deducting the oscillatory wave form 400 from the oscillatory wave form 300) of FIG. 6.

With this configuration, the sound of the glass run 10 alone is detected among sounds of various parts as well as the glass run 10 by picking out the relative oscillation of the door glass 2 in relation to the frame 100. The sounds are made by the oscillation which is generated when the door 1 is closed.

The controller 71 reads out the synthesized oscillatory wave form 500, stored at the storage 72. The controller 71 makes oscillation by an oscillator 40 on an exterior of the automobile and oscillates the door glass 2 as illustrated in FIG. 4.

Figure 8:
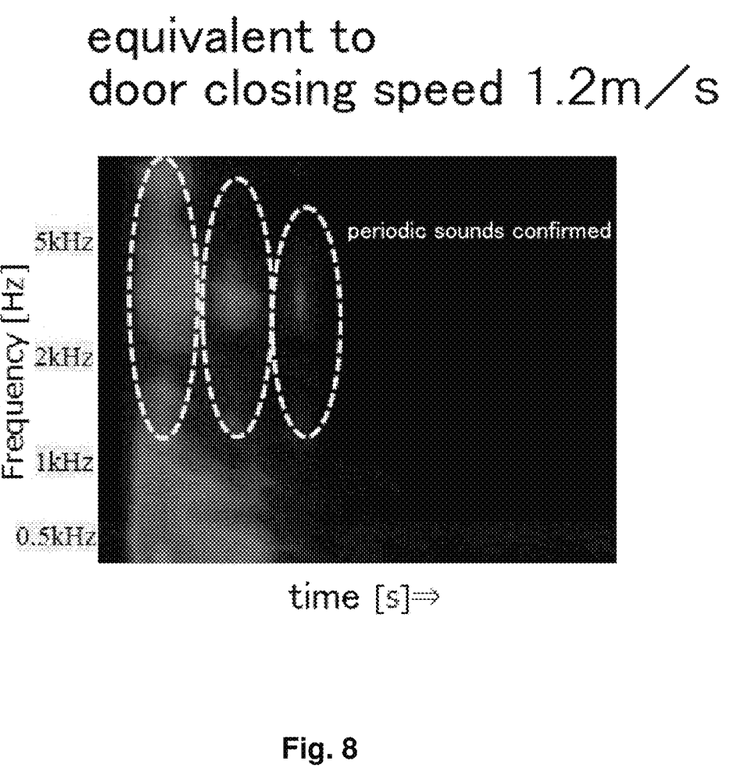
FIG. 8 is a view of visualized sound detected by a microphone illustrated in FIG. 4.

A microphone 50 on an interior of the automobile detects the sound accompanying the oscillation, and the controller 71 commands visualization of the sound. Methods of the visualization include coloring and shading as illustrated in FIG. 8. The output unit 73 visualizes the sound which is commanded to be visualized on a display. FIG. 8 illustrates periodic sounds which are made at regular intervals relative to time.

Reading out and using the synthesized oscillatory wave form 500, stored at the storage 72, reproduces the oscillation of the glass run 10 and the sound accompanying the oscillation made on the real automobile when the door 1 is closed. Reproduction of the oscillation and the sound enables repeated experiments.

As a result, the glass run 10 is modified in shape and material in consideration of the oscillation of the glass run 10 when the door 1 is closed.

when the automobile moves on bumpy roads

In the same manner as "when the door 1 is closed (the automobile is stopped)" discussed above, the door glass 2 is at the slight distance from the closed position, and the sensor 20 for the door glass and the sensor 30 for the frame are fixed on the door glass 2 and the frame 100, respectively, as illustrated in FIG. 3, with an exception that the real automobile moves. Examples of the usable sensor 20 and the usable sensor 30 include the contactless sensors as discussed above.

When the automobile moves, the shock is generated and makes the oscillation. The sensor 20 detects the oscillation of the door glass 2 and the sensor 30 detects the oscillation of the frame 100 simultaneously. The sensor 20 and the sensor 30 transmit detected information to the controller 71. The controller 71 stores the oscillation of the door glass 2 as the oscillatory wave form 300 of the door glass at the storage 72 and the oscillation of the frame 100 as the oscillatory wave form 400 of the frame at the storage 72.

The controller 71 transmits the oscillatory wave form 300 and the oscillatory wave form 400 to the synthesizer 75 of the wave forms. The synthesizer 75 synthesizes the oscillatory wave form 300 and the oscillatory wave form 400, and picks out the relative oscillation of the door glass 2 in relation to the frame 100 as the synthesized oscillatory wave form 500. More specifically, the synthesized oscillatory wave form 500 is found by deducting the value of the oscillatory wave form 400 from the value of the oscillatory wave form 300. The synthesizer 75 transmits the synthesized oscillatory wave form 500 to the controller 71. The controller 71 stores the synthesized oscillatory wave form 500 at the storage 72.

With this configuration, sound of the glass run 10 alone is detected among the sounds of various parts as well as the glass run 10 by picking out the relative oscillation of the door glass 2 in relation to the frame 100. The sounds are made by the oscillation which is generated when the automobile moves on the bumpy roads.

The controller 71 reads out the synthesized oscillatory wave form 500, stored at the storage 72. The controller 71 makes oscillation by an oscillator 40 on the exterior of the automobile and oscillates the door glass 2.

The microphone 50 on the interior of the automobile detects the sound accompanying the oscillation, and the controller 71 commands visualization of the sound. Methods of the visualization include coloring and shading as illustrated in FIG. 8.

Reading out and using the synthesized oscillatory wave form 500, stored at the storage 72, reproduces the oscillation of the glass run 10 and the sound accompanying the oscillation made on the real automobile when the automobile moves on the bumpy roads. Reproduction of the oscillation and the sound enables repeated experiments with the automobile stopped.

As a result, the glass run 10 is modified in shape and material in consideration of the oscillation of the glass run 10 when the automobile moves on the bumpy roads.

The "bumpy roads" are hard to define precisely. The "bumpy roads" include road without pavement and rough roads as compared with smooth roads. Public highways may be the "bumpy roads" as compared with expressways. Also, expressways aged and worsened may be the "bumpy roads" as compared with expressways which has been just paved.

Accordingly, the present invention is applicable to the automobile which is moving. The present invention is effective in designing the glass run 10, which does not make noise when the automobile moves on the roads in unfavorable conditions at least slightly.

In the present embodiment, the oscillator 40 makes the oscillation which corresponds to the synthesized oscillatory wave form 500 and oscillates the door glass 2 with the glass run 10 coupling to the frame 100 of the real automobile. Accordingly, the oscillation of the glass run 10 and the sound accompanying the oscillation when the door 1 is closed or when the automobile moves on the bumpy roads is reproduced. But, the oscillation of the glass run 10 and the sound accompanying the oscillation is reproduced on an experimental bench with the same configuration, not on the real automobile.

More specifically, the glass run 10 couples to a mock frame 101 on the experimental bench, for guiding a mock door glass 102 in the mock frame 101, the oscillator 40 on the front surface of the mock door glass 102 makes the oscillation which corresponds to the synthesized oscillatory wave form 500 and oscillates the mock door glass 102, the microphone 50 on a rear surface of the mock door glass 102 detects the sound of the oscillation which is made by the oscillator 40 and which corresponds to the synthesized oscillatory wave form 500. The mock frame 101 corresponds to the frame 100. The mock door glass 102 corresponds to the door glass 2.

The output unit 73 visualizes the sound detected by the microphone 50 on the display.

Figure 9:
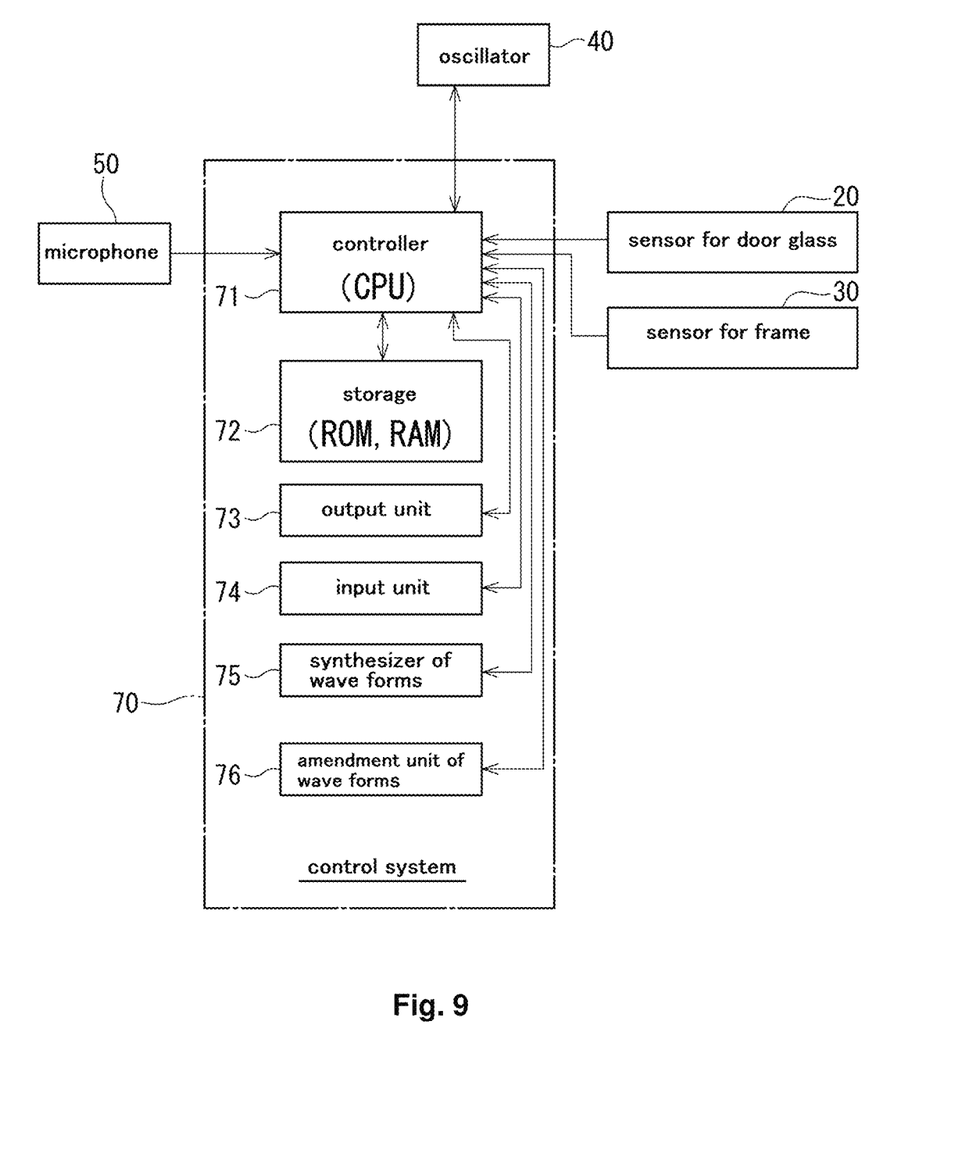
FIG. 9 is the block diagram illustrating the electrical components for practicing the method according to the embodiment of the invention of evaluating the noise of the glass run with an amendment unit of wave forms added.

The control system 70 may also include an amendment unit of wave forms as illustrated in FIG. 9 to update the synthesized oscillatory wave form 500.

An amendment control of wave forms is a step after the controller 71 makes oscillation which corresponds to the synthesized oscillatory wave form 500 by the oscillator 40 and oscillates the door glass 2. The synthesized oscillatory wave form 500 is the relative oscillation of the door glass 2 in relation to the frame 100 and is picked out from synthesis of the oscillatory wave form 300 and the oscillatory wave form 400, synthesized by the synthesizer 75.

Figure 10:
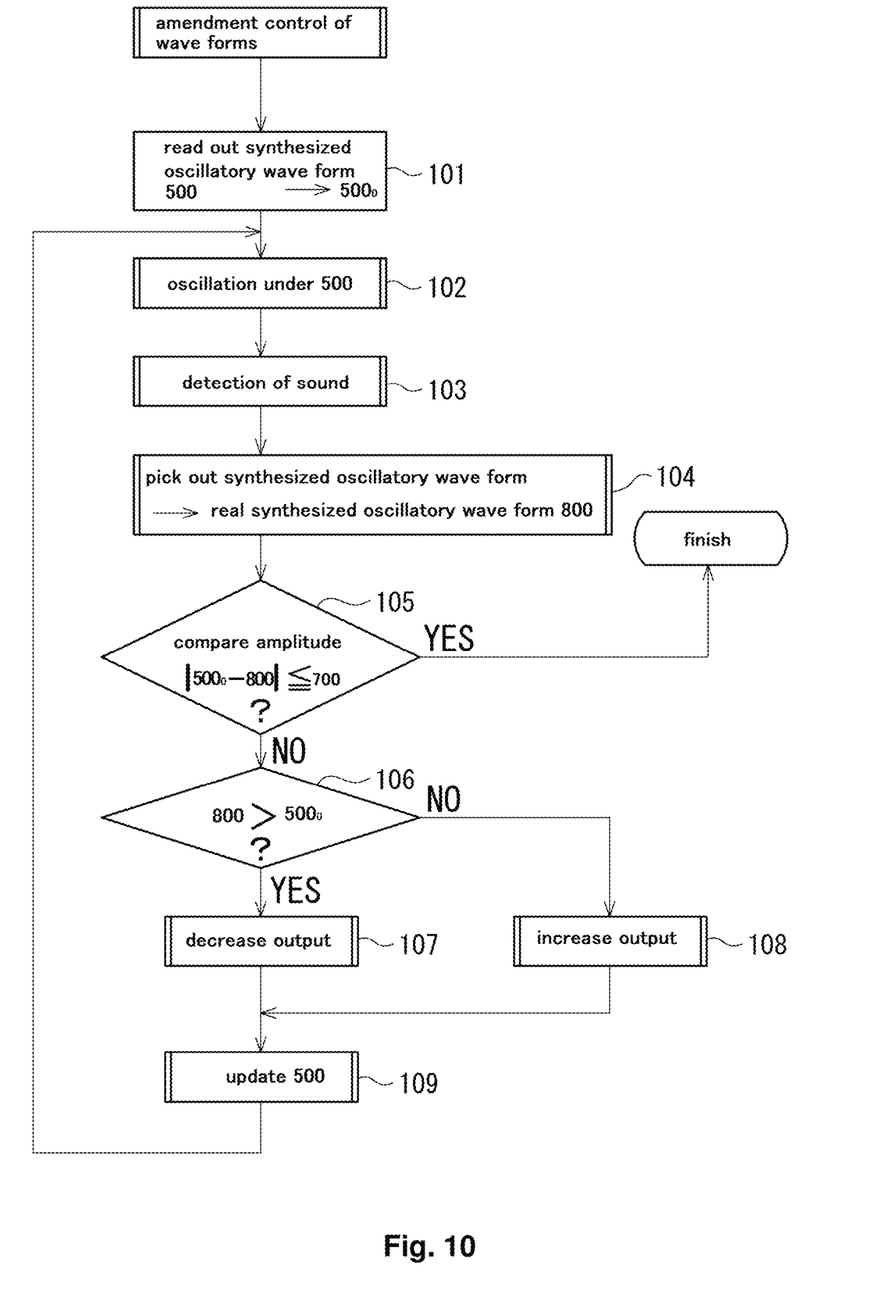
FIG. 10 is a flowchart illustrating an amendment control of wave forms in the amendment unit of wave forms of FIG. 9.

Referring to a flowchart illustrated in FIG. 10, the amendment control of wave forms is discussed. The controller 71 reads out the synthesized oscillatory wave form 500, stored at the storage 72. The synthesized oscillatory wave form 500 is picked out from synthesis of the oscillatory wave form 300 and the oscillatory wave form 400. The controller 71 stores the synthesized oscillatory wave form 500 as a register $500_0$ (step 101 (the word "step" omitted hereinafter)).

The controller 71 makes oscillation which corresponds to the synthesized oscillatory wave form 500 by the oscillator 40 on the exterior of the automobile and oscillates the door glass 2 artificially (102). The microphone 50 detects the sound accompanying the oscillation (103).

After detection of oscillations by the sensor 20 for the door glass and the sensor 30 for the frame, the controller 71 picks out a synthesized oscillatory wave form again when the door glass 2 is artificially oscillated to find the value. The controller 71 stores the value as a real synthesized oscillatory wave form 800 at a register 800 (104). The synthesizer 75 synthesizes the oscillatory wave form 300 of the door glass and the oscillatory wave form 400 of the frame, and picks out relative oscillation of the door glass 2 in relation to the frame 100 as the real synthesized oscillatory wave form 800. The sensor 20 and the sensor 30 detect the oscillatory wave form 300 and the oscillatory wave form 400, respectively.

The controller 71 compares the wave form at the register 800 with the wave form at the register $500_0$ (105). The register 800 corresponds to the real synthesized oscillatory wave form 800. The register $500_0$ corresponds to the synthesized oscillatory wave form $500_0$ of the oscillation of the glass run alone when the door is closed (the automobile is stopped) or when the automobile moves on bumpy roads as discussed above. The controller 71 checks if the difference is not more than a fixed value 700 (106). In the present embodiment, the controller 71 checks if an average of difference in amplitude of the synthesized oscillatory wave form is not more than the fixed value 700 over a plurality of hours.

In case the value of the register 800 is larger than the value of the register $500_0$, the controller 71 decreases output (power) from the oscillator 40 (107). On the other hand, in case the value of the register 800 is smaller than the value of the register $500_0$, the controller 71 increases output (power) of the oscillator 40 (108).

The rate of increase or decrease in the output from the oscillator 40 is determined beforehand and the output is increased or decreased gradually.

The controller 71 commands an amendment unit 76 of wave forms to update the synthesized oscillatory wave form 500 (109) such that the next oscillation made by the oscillator 40 corresponds to the synthesized oscillatory wave form which is amended by increasing or decreasing the output.

Going back to step 102, the controller 71 makes oscillation which corresponds to the synthesized oscillatory wave form 500, which is updated, by the oscillator 40. Also, the controller 71 picks out the real synthesized oscillatory wave form 800 in the same manner. The real synthesized oscillatory wave form 800 varies depending on alteration in the output from the oscillator 40.

When the difference between the wave form of the register 800 and the wave form of the register $500_0$ is not more than the fixed value 700 as mentioned in step 105 as a result of repeated operations, the amendment control processing of wave forms is finished. The wave form of the register 800 corresponds to the real synthesized oscillatory wave form 800. The wave form of the register $500_0$ corresponds to the synthesized oscillatory wave form $500_0$ of the oscillation of the glass run alone.

The sound finally detected by the microphone 50 in step 103 is the noise to be evaluated. The noise is subjected to a process of visualizing the sound.

Figure 11:
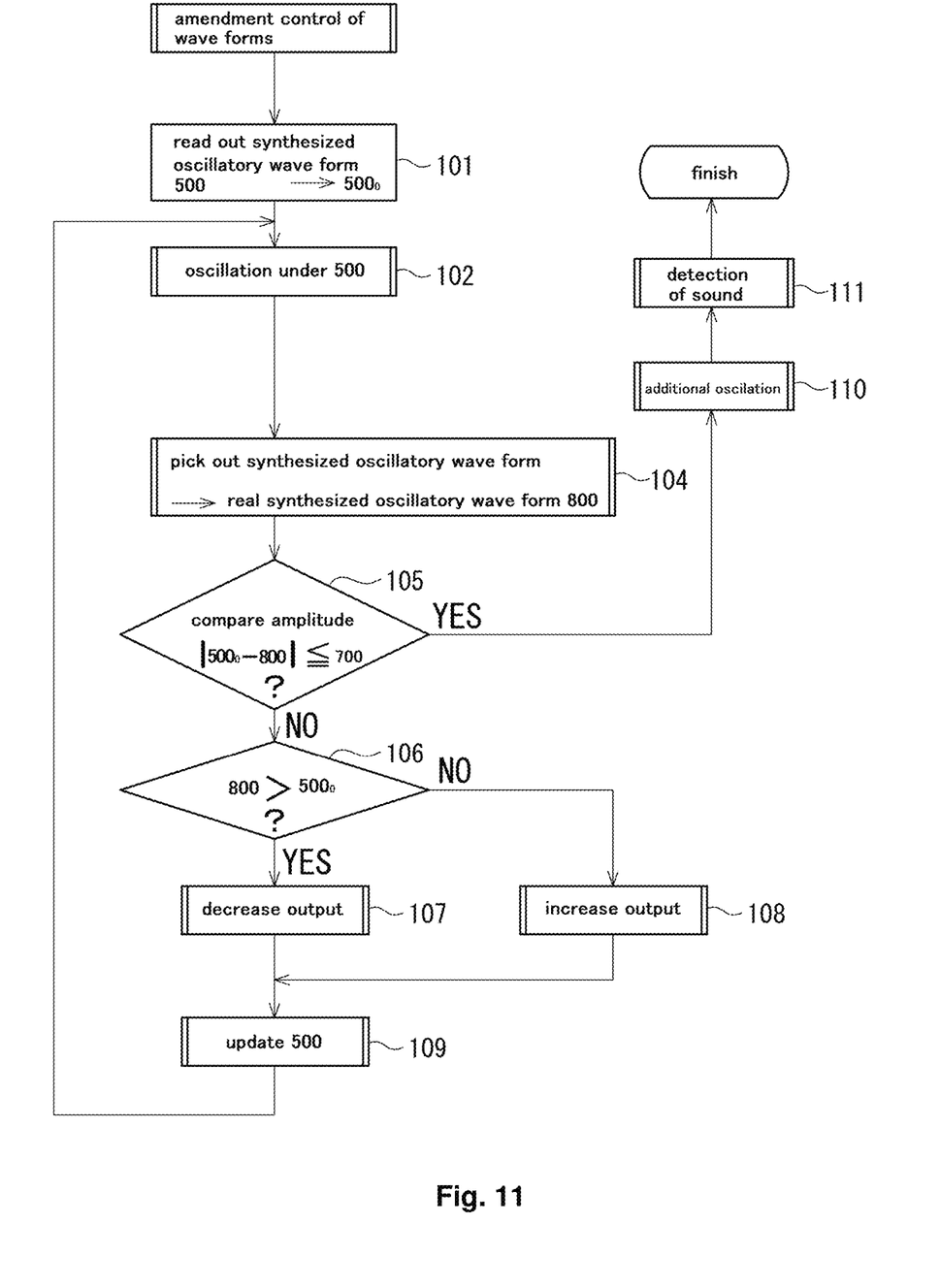
FIG. 11 is another flowchart illustrating the amendment control of wave forms in the amendment unit of wave forms of FIG. 9.

While in this embodiment the microphone 50 always detects the sound every time the oscillator 40 makes oscillation, this should not be construed in a limiting sense. Another possible embodiment is that the microphone 50 detects the sound only once as illustrated in the flowchart of FIG. 11. More specifically, the controller 71 compares the wave form of the register 800 with the wave form of the register 500o. The register 800 corresponds to the wave form of the real synthesized oscillatory wave form 800. The register 500o corresponds to the synthesized oscillatory wave form $500_0$ of the oscillation of the glass run alone when the door is closed (the automobile is stopped) or when the automobile moves on bumpy roads as discussed above. When the difference between the wave form of the register 800 and the wave form of the register $500_0$ is not more than the fixed value 700 (YES in step 105), the oscillator makes oscillation again (110), and the microphone 50 detects the sound accompanying the oscillation (111).

While in this embodiment in the comparison between the synthesized oscillatory wave form $500_0$ and the real synthesized oscillatory wave form 800 in step 105, the controller 71 checks if the average of the difference in amplitude of the synthesized oscillatory wave form is not more than the fixed value 700 over the plurality of hours, this should not be construed in a limiting sense.

While in this embodiment in the comparison between the synthesized oscillatory wave form $500_0$ and the real synthesized oscillatory wave form 800, the controller 71 checks the difference in amplitude between the synthesized oscillatory wave form $500_0$ and the real synthesized oscillatory wave form 800, and in case the difference (absolute value in difference) between the wave forms is more than the fixed value 700, the output from the oscillator 40 is controlled to be increased or decreased. But this should not be construed in a limiting sense. Another possible embodiment as an alternative or as an addition to this embodiment is that the controller 71 checks difference in frequency between the wave forms, and in case the difference is detected, the real synthesized oscillatory wave form 800 is controlled to approach the synthesized oscillatory wave form $500_0$.

Another possible embodiment is that the controller 71 performs the processing which the amendment unit 76 of wave forms performs in the present embodiment without the amendment unit 76 of wave forms.

More specifically, the method further includes amending the wave forms after oscillating the door glass 2 on the real automobile. The real synthesized oscillatory wave form 800 is controlled to approach the synthesized oscillatory wave form 500o. The synthesized oscillatory wave form corresponds to the oscillation made by the oscillator 40. The real synthesized oscillatory wave form 800 corresponds to the artificial oscillation made on the door glass 2. With this configuration, the oscillation of the glass run 10 and the sound accompanying the oscillation, which are made on the real automobile, are reproduced on an experimental automobile more precisely.

Since the oscillator 40 makes the oscillation which corresponds to the synthesized oscillatory wave form and the artificial oscillation made on the door glass which corresponds to the real synthesized oscillatory wave form 800, the real synthesized oscillatory wave form 800 should be the same as the synthesized oscillatory wave form 500o. But when the oscillator 40 makes the oscillation, a prop to which the oscillator 40 couples, for example, as well as the oscillator 40 oscillates and therefore, the oscillation is attenuated. Also, an environment surrounding the real automobile varies the oscillation. In this connection, amending the wave forms performs a feedback control to amend the difference such that the real synthesized oscillatory wave form 800 is the same as the synthesized oscillatory wave form $500_0$.

Amending the wave forms is also applicable to the experimental bench after oscillating the mock door glass 2 to evaluate the noise.

While in this embodiment the door glass 2 is between the closed position and the half-open (½) position when the sensor 20 for the door glass and the sensor 30 for the frame detect the oscillation, this should not be construed in a limiting sense. Another possible embodiment is that the door glass 2 is in the fully-opened position or in the closed position. But the door glass 2 is preferably at a distance from the closed position and at a distance from the fully-opened position. This is because the door glass 2 in the fully-opened position generates small width in the oscillation and is hard to transmit the sound to the interior of the automobile.

While in this embodiment, the sound is visualized by coloring and shading, this should not be construed in a limiting sense. Another possible embodiment is that weakness and strength in sound represents the sound.

We claim:

1. A method for evaluating noise of a glass run of an automobile door, the glass run guiding a door glass in a frame, the glass run forming a channel, the method comprising:

detecting oscillation of the door glass by a sensor for the door glass and then storing the oscillation as an oscillatory wave form of the door glass and detecting oscillation of the frame by a sensor for the frame and then storing the oscillation as an oscillatory wave form of the frame, with the glass run coupling to the automobile door;

synthesizing the oscillatory wave form of the door glass and the oscillatory wave form of the frame, picking out relative oscillation of the door glass in relation to the frame and storing the relative oscillation as a synthesized oscillatory wave form;

making oscillation by an oscillator and oscillating the door glass with the automobile stopped, the oscillation corresponding to the synthesized oscillatory wave form, the oscillator being on an exterior of the automobile; and detecting sound of the oscillation by a microphone, the oscillation being made by the oscillator, the oscillation corresponding to the synthesized oscillatory wave form, the microphone being on an interior of the automobile.

2. A method for evaluating noise of a glass run of an automobile door, the glass run guiding a door glass in a frame, the glass run forming a channel, the method comprising:

detecting oscillation of the door glass by a sensor for the door glass and then storing the oscillation as an oscillatory wave form of the door glass and detecting oscillation of the frame by a sensor for the frame and then storing the oscillation as an oscillatory wave form of the frame, with the glass run coupling to the automobile door;

synthesizing the oscillatory wave form of the door glass and the oscillatory wave form of the frame, picking out relative oscillation of the door glass in relation to the frame and storing the relative oscillation as a synthesized oscillatory wave form;
coupling the glass run to a mock frame on an experimental bench, guiding a mock door glass in the mock frame, making oscillation by an oscillator and oscillating the mock door glass, the mock frame corresponding to the frame, the mock door glass corresponding to the door glass, the oscillation corresponding to the synthesized oscillatory wave form, the oscillator being on a surface of the mock door glass; and
detecting sound of the oscillation by a microphone, the oscillation being made by the oscillator, the oscillation corresponding to the synthesized oscillatory wave form, the microphone being on a rear surface of the mock door glass.

3. The method for evaluating the noise of the glass run of the automobile door as claimed in claim 1, wherein: the sensor for the door glass and the sensor for the frame detect oscillation, the oscillation being made while the automobile is moving.

4. The method for evaluating the noise of the glass run of the automobile door as claimed in claim 1, wherein: the sensor for the door glass and the sensor for the frame detect oscillation, the oscillation being made when the automobile door moved to a closed position from an opened position with the automobile stopped.

5. The method for evaluating the noise of the glass run of the automobile door as claimed in claim 1, wherein: the door glass is at a distance from the closed position and at a distance from a fully-opened position when the sensor for the door glass and the sensor for the frame detect the oscillation.

6. The method for evaluating the noise of the glass run of the automobile door as claimed in claim 1, wherein: the method further comprises visualizing the sound detected by the microphone.

7. The method for evaluating the noise of the glass run of the automobile door as claimed in claim 1, wherein: the method further comprises, after oscillating the door glass,
amending the wave forms by making oscillation which corresponds to the synthesized oscillatory wave form by the oscillator, detecting the oscillation of the door glass by the sensor for door glass and detecting the oscillation of the frame by the sensor for the frame, picking out a synthesized oscillatory wave form, as a real synthesized oscillatory wave form, configured to oscillate the door glass artificially, comparing the synthesized oscillatory wave form with the real synthesized oscillatory wave form, and amending the real synthesized oscillatory wave form by altering an output from the oscillator such that difference between the synthesized oscillatory wave form and the real synthesized oscillatory wave form is not more than a fixed value; and
substituting the real synthesized oscillatory wave form which is amended in amending the wave forms for the synthesized oscillatory wave form in detecting sound.

8. The method for evaluating the noise of the glass run of the automobile door as claimed in claim 2, wherein: the method further comprises, after oscillating the door glass,
amending the wave forms by making oscillation which corresponds to the synthesized oscillatory wave form by the oscillator, detecting the oscillation of the mock door glass by the sensor for door glass and detecting the oscillation of the mock frame by the sensor for the frame, picking out a synthesized oscillatory wave form, as a real synthesized oscillatory wave form, configured to oscillate the mock door glass artificially comparing the synthesized oscillatory wave form with the real synthesized oscillatory wave form, and amending the real synthesized oscillatory wave form by altering an output from the oscillator such that difference between the synthesized oscillatory wave form and the real synthesized oscillatory wave form is not more than a fixed value; and
substituting the real synthesized oscillatory wave form which is amended in amending the wave forms for the synthesized oscillatory wave form in detecting sound.

9. The method for evaluating the noise of the glass run of the automobile door as claimed in claim 2, wherein: the sensor for the door glass and the sensor for the frame detect oscillation, the oscillation being made while the automobile is moving.

10. The method for evaluating the noise of the glass run of the automobile door as claimed in claim 2, wherein: the sensor for the door glass and the sensor for the frame detect oscillation, the oscillation being made when the automobile door moved to a closed position from an opened position with the automobile stopped.

11. The method for evaluating the noise of the glass run of the automobile door as claimed in claim 2, wherein: the door glass is at a distance from the closed position and at a distance from a fully-opened position when the sensor for the door glass and the sensor for the frame detect the oscillation.

12. The method for evaluating the noise of the glass run of the automobile door as claimed in claim 2, wherein: the method further comprises visualizing the sound detected by the microphone.

* * * * *